March 5, 1968 J. P. COX 3,371,896
CLAMPING CHRISTMAS TREE STAND
Filed Nov. 19, 1965 2 Sheets-Sheet 1

INVENTOR.
JAMES P. COX

March 5, 1968     J. P. COX     3,371,896
CLAMPING CHRISTMAS TREE STAND
Filed Nov. 19, 1965     2 Sheets-Sheet 2
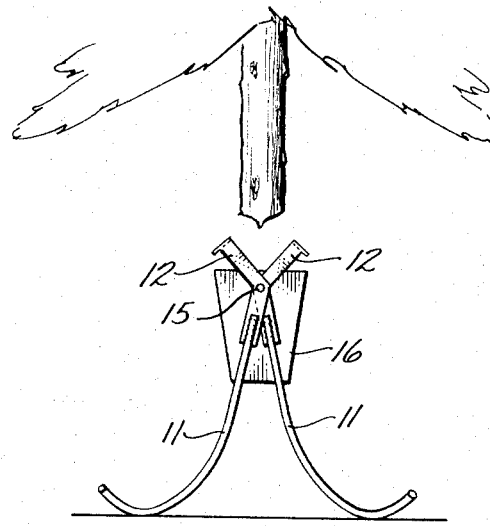
Fig. 8.
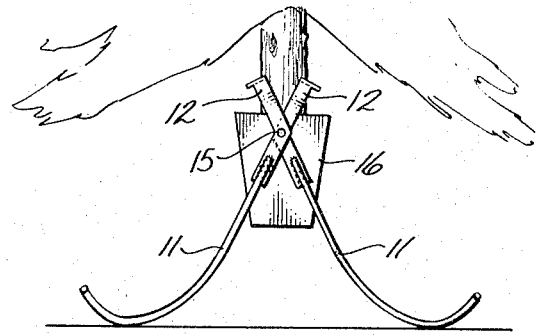
Fig. 9.
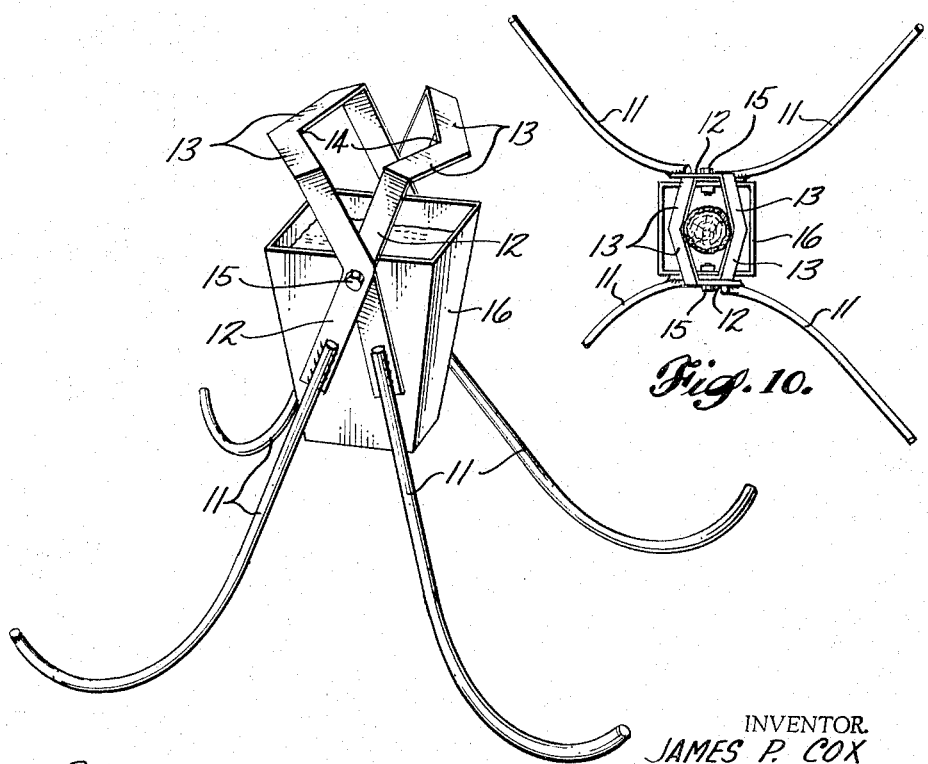
Fig. 7.
Fig. 10.
INVENTOR.
JAMES P. COX

United States Patent Office 3,371,896
Patented Mar. 5, 1968

3,371,896
CLAMPING CHRISTMAS TREE STAND
James P. Cox, 17660 SE. Alder,
Portland, Oreg. 97223
Filed Nov. 19, 1965, Ser. No. 508,816
1 Claim. (Cl. 248—46)

ABSTRACT OF THE DISCLOSURE

Crossbars forming the tops of two pivotally connected U-shaped members are pressed toward each other to clamp a pole, such as a Christmas tree trunk, between them. Each U-shaped member includes an arched portion and legs diverging downwardly away from the arched portion. Pivots connect opposite sides of the arched portions and support a cup between the arched portions to receive the lower end of a pole or trunk. The arched portions are arranged in substantially parallel planes with the legs diverging downwardly away from such planes.

An object of the present invention is to provide a Christmas tree stand which can be applied quickly and easily to a Christmas tree and which, when thus applied, will support the tree firmly in position.

A further object is to provide such a stand which will be economical to manufacture and of rugged construction.

A further object is to enable such a stand to be applied to trees of different size with equal facility.

In such a stand it is an object to provide a container to hold water for keeping the trunk of the Christmas tree moist.

A Christmas tree stand construction capable of accomplishing the foregoing objects can be constructed from two bent frame members of generally U-shape which are pivotally connected so that cooperating arches of such frame members clampingly engage opposite sides of a tree trunk, and the ends of such frame members form supporting legs and feet. A cup for holding water and the bottom of the Christmas tree trunk is suspended from the pivot means connecting the opposite sides of the arch portions of the frame members.

FIGURE 7 is a top perspective of an alternative form of Christmas tree stand and FIGURE 8 is a side elevation of such stand in condition to receive the trunk of a Christmas tree. FIGURE 9 is a similar view of the stand showing the Christmas tree in place.

FIGURE 10 is a plan of the alternate type of tree stand, with parts broken away.

In order to facilitate manufacture of the Christmas tree stand, it is preferred that the two frame members be of identical construction, but designed so that two of the frame members can be interconnected to form the two sides of the Christmas tree stand. Each of the two frame members included in the Christmas tree stand shown in FIGURES 1 to 5 inclusive is of generally U-shape and includes inclined leg portions 1, the lower ends of which are turned up to form feet. These inclined leg portions are integral with the lower ends of an arch including side members 2 joined by the cross member 3. The central portion of such cross member is bent to form a tree trunk-engaging curve 4.

Figure 1:
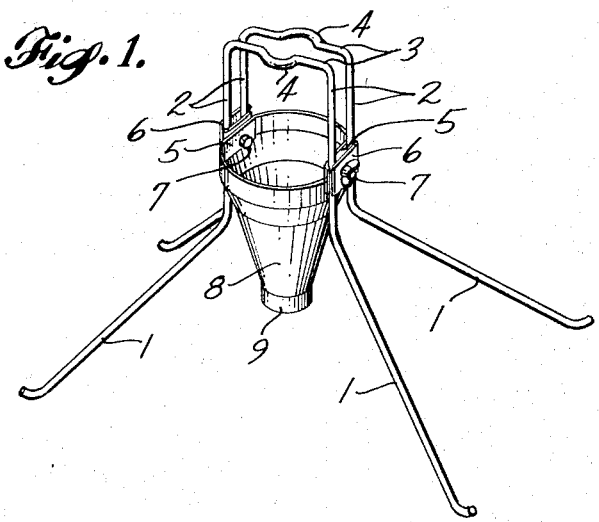
FIGURE 1 is a top perspective of a preferred form of Christmas tree stand.
Figure 4:
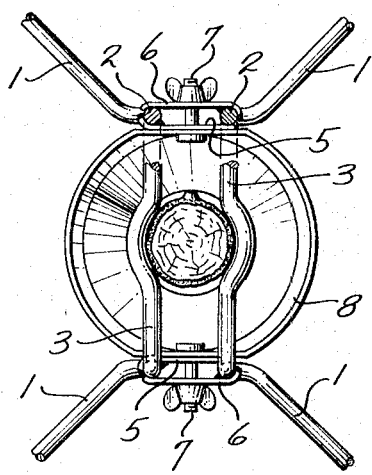
FIGURE 4 is a plan of the Christmas tree stand on an enlarged scale and with parts broken away.
Figure 2:
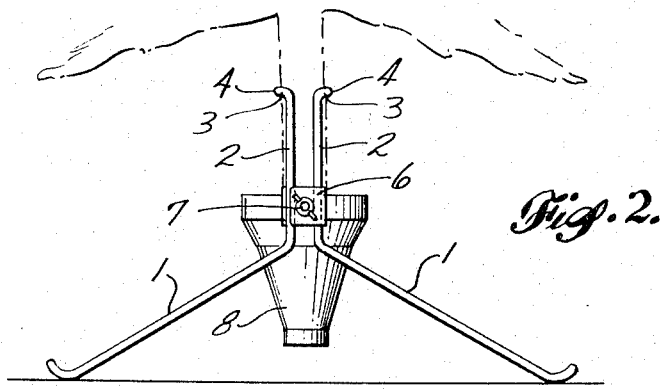
FIGURE 2 is a side elevation of such stand shown in condition to supportingly engage a comparatively small Christmas tree trunk and FIGURE 3 is a similar view showing the Christmas tree stand engaged with a larger Christmas tree trunk.

The opposite side portions 2 of each frame member carry plates 5 and 6, respectively, which are secured to the arch sides by one edge, such as by spot welding. When two frame members are arranged oppositely, such plates can be located in overlapping relationship, as shown in FIGURE 4. These plates have holes through them to receive an interconnecting pivot bolt 7 which may include a wing nut to facilitate tightening and loosening the bolt. The secured edge of each plate is shown as being bent to conform to engage the stock of the frame members contiguously. In the Christmas tree stand of FIGURES 1 to 5 inclusive, the frame members are constructed of round rod stock. The opposite free edge portion of each plate 5 and 6 is flat so that the arch portions of the frame can be tiltled relatively to vary the spacing of the cross members 3 for receiving a Christmas tree trunk between them and for clamping Christmas tree trunks of different size.

Figure 3:
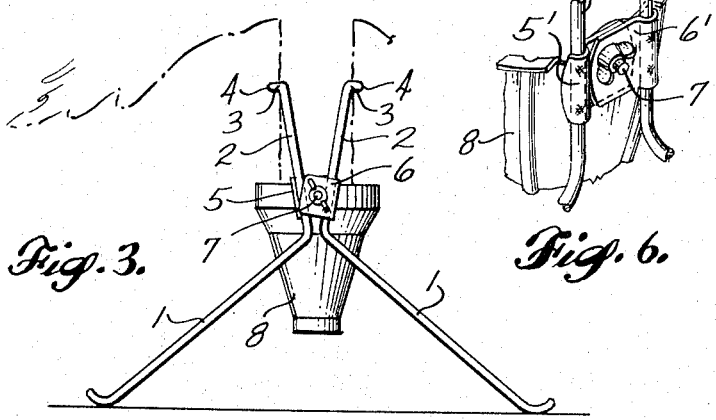

A cup 8 is suspended by the pivot bolts 7 extending through holes in the rim of the cup at its opposite sides. Such cup may taper downwardly to provide a bottom socket 9 of a size to receive the lower end of a Christmas tree trunk of average size. A larger Christmas tree trunk, such as indicated in FIGURE 3, can engage the tapered portion of the cup above the socket 9 so as to be centered in the cup. In order to provide friction between the rim of the cup 8 and the inner plates 5 and 6 so as to deter swinging of the cup about the pivot bolts 7, the sides of the cup rim through which the bolts 7 extend preferably are flattened, as shown in FIGURE 4.

In order to support a Christmas tree in a Christmas tree stand of the type shown in FIGURES 1 to 5 inclusive, the leg portions 1 of the opposite frame members are moved toward each other so that the arched portions of the frames will be tilted away from each other. The Christmas tree trunk can then be inserted readily between the curves 4 and moved downward until the lower end of the Christmas tree trunk engages the bottom portion of the cup 8. Downward pressure on the Christmas tree trunk with the feet of the stand engaging the floor will then cause the leg portions of the stand to spread so as to tilt the tree trunk-engaging curves 4 toward each other into the trunk-clamping position of FIGURE 2 or FIGURE 3, depending upon the size of the Christmas tree trunk. The tree trunk will then be attached firmly to the Christmas tree stand by the engagement of its lower end with the cup 8 and the clamping engagement of the two curved portions 4 with opposite sides of the Christmas tree trunk at a location spaced a substantial distance from its lower end. The wide spread of the legs will cause the stand and Christmas tree to be supported stably.

Figure 6:
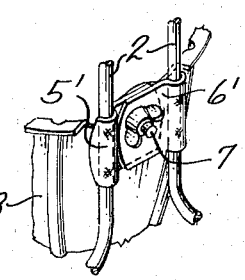
FIGURE 5 is a top perspective of a fragmentary portion of the Christmas tree stand on an enlarged scale and FIGURE 6 is a similar view of the same portion of the Christmas tree stand showing a modified construction.
Figure 5:
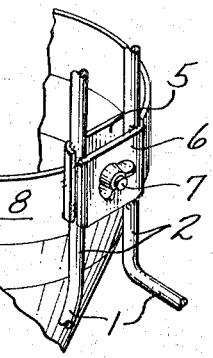

In FIGURE 6 a modified plate and pivot arrangement is shown in which the plates 5' and 6' are bent around the leg elements to a greater extent so that when the frame members are assembled the plates 5' and 6' will be in face-to-face engagement instead of being spaced apart a distance approximately equal to the thickness of the frame members, as shown in FIGURES 4 and 5. Such a construction will enable the bolt 7 to press the members 5' and 6' into engagement so as to increase the friction between the plates for reducing the tendency of the frame members to be tilted relative to each other.

In the modified type of Christmas tree stand shown in FIGURES 7 to 10, the leg portions 11 of each generally U-shaped frame member again are made of round stock. Such leg portions are secured, such as by welding, to arch portions made of flat bar stock, as shown best in FIGURE 7. The sides 12 of the arches are bent to form apexes which overlap when two of such frame members are assembled. Also the cross member 13 of each arch portion is bent to provide an internal angle 14 engageable with a Christmas tree trunk.

As in the type of Christmas tree stand shown in FIGURES 1 to 5 inclusive, the frame members of the stand of FIGURES 7 to 10 inclusive also are identical. When these frame members are reversed relatively and assembled, one side member of one arch portion will be inside and the other side member of such arch portion will be outside. The overlapping angles of the arch portions can then be connected by bolts 15. A cup 16, which may be of frustopyramidal shape, is suspended from the pivot bolts 15 which pass through holes in the opposite rim portions of the cup.

The operation of the Christmas tree stand shown in FIGURES 7 to 10 is generally similar to that of the stand illustrated in FIGURES 1 to 5. By moving the leg portions of the frame members toward each other, the cross members 13 of the frame arches will be spread apart to receive the trunk of a Christmas tree in the manner shown in FIGURE 8. When the bottom of the Christmas tree is lowered to engagement with the bottom of the cup 16 and is then forced downward, the pivot bolts 15 will be moved downward creating a force tending to move apart the lower ends of the leg portions 11. Such spreading movement of the legs will tilt the arched portions of the frames about the pivot bolts 15 so that the angles 14 will clamp opposite sides of the Christmas tree trunk, as shown in FIGURES 9 and 10. Downward pressure of the tree on the Christmas tree stand will simply tend to cause the cross members 13 to clamp the Christmas tree trunk more tightly.

In both instances the tree trunk can be removed quickly and easily from the Christmas tree stand simply by moving the leg portions of the frames toward each other which will swing the cross members of the arches away from each other to withdraw them from the Christmas tree trunk. The trunk can then be lifted out of the stand easily.

I claim as my invention:
1. A Christmas tree stand comprising two members of generally U-shape, each of said U-shaped members being a single rigid piece including an arched portion having a tree trunk-engaging crossbar and supporting legs extending downwardly from opposite sides, respectively, of said arched portions, pivot means connecting the opposite sides of said arched portions at locations spaced from their crossbars and guiding said U-shaped members for relative swinging about an axis extending substantially parallel to said arched portions, said supporting legs of each U-shaped member being located at the same side of said pivot means as the crossbar of the same U-shaped member so that the crossbars of said arched portions are spread apart by approach movement of the legs of said two U-shaped members and said crossbars are pressed toward each other in tree trunk-clamping relationship by spreading of said legs, said supporting legs being bent at an angle to the arched portions of their respective U-shaped members for disposition of the legs of said two members diverging downward from said pivot means when the arched portions of said U-shaped members are in adjacent substantially parallel planes, and a cup disposed between the sides of said arched portions and suspended from said pivot means for receiving the lower end of a Christmas tree trunk clamped between the crossbars of said arched portions.

References Cited
UNITED STATES PATENTS

| 834,377 | 10/1906 | Foster | 248—173 |
|---|---|---|---|
| 960,916 | 6/1910 | Heiser | 248—168 X |
| 1,040,593 | 10/1912 | Trilling | 248—46 |
| 2,485,081 | 10/1949 | Ahrens | 248—46 |

ROY D. FRAZIER, *Primary Examiner.*

CHANCELLOR E. HARRIS, JOHN PETO,
*Examiners.*

R. P. SEITTER, *Assistant Examiner.*